(12) United States Patent
DeMars et al.

(10) Patent No.: US 8,118,019 B2
(45) Date of Patent: Feb. 21, 2012

(54) COOKING APPARATUS WITH CHARCOAL STARTING DEVICE

(75) Inventors: Robert DeMars, La Quinta, CA (US); Alan Crawford, Burbank, CA (US)

(73) Assignee: Original Ideas, Inc, La Quinte, CA (US)

( * ) Notice: Subject to any disclaimer, the term of this patent is extended or adjusted under 35 U.S.C. 154(b) by 281 days.

(21) Appl. No.: 12/378,958

(22) Filed: Feb. 23, 2009

(65) Prior Publication Data

US 2010/0212652 A1    Aug. 26, 2010

(51) Int. Cl.
  *A47J 37/07* (2006.01)
  *F23H 17/08* (2006.01)
  *F23H 13/00* (2006.01)
(52) U.S. Cl. ............... 126/25 B; 126/25 R; 126/153; 126/154; 126/152 B (58) Field of Classification Search .............. 126/25 B, 126/25 R, 153, 154, 152 B
See application file for complete search history.

(56) References Cited

U.S. PATENT DOCUMENTS

| 5,875,772 A * | 3/1999 | Saey ................... 126/25 R |
| 2004/0154603 A1 * | 8/2004 | Crawford et al. ........... 126/25 R |

* cited by examiner

*Primary Examiner* — Kenneth Rinehart
*Assistant Examiner* — William Corboy
(74) *Attorney, Agent, or Firm* — Dan De La Rosa (57) ABSTRACT

A barbecue cooking system with moveable charcoal chimney device is provided, the system comprises: a firebowl having an open topside and a bottomside, and the bottomside comprising at least one aperture; and a chimney movable through the aperture of the bottomside of the firebowl, and at least a portion of the chimney is situated within the firebowl during a usage position and at least a portion of the chimney is moveable to a position below the firebowl during a stowage position.

38 Claims, 10 Drawing Sheets

COOKING APPARATUS WITH CHARCOAL STARTING DEVICE

BACKGROUND OF THE INVENTION

1. Field of the Invention

The present invention relates to a cooking apparatus with a charcoal starting device and more specifically, a charcoal preparation system for a cooking apparatus, and the system comprises: a firebowl having an open topside and a bottomside, the bottomside comprises at least one aperture; and the charcoal starting device comprises a charcoal grate and a chimney, the charcoal grate is moveable to a first position below the firebowl during a charcoal igniting stage and to a second position within the firebowl during a cooking stage, and at least a portion of the charcoal starting device designed to fit within the chimney, and the chimney is movable through said aperture of the bottomside of the firebowl, and at least a portion of the chimney is situated within the firebowl during a usage position and is moveable to a position below the firebowl during a stowage position.

2. Description of the Related Art

It is known in the art to use charcoal as a source for cooking heat in barbecues. In order to start the charcoal barbecues, the charcoals must be burned quickly to commence the cooking process without substantial delay. Chimneys have been used with charcoal barbecues in preparation of the charcoals.

The present invention provides for a charcoal preparation system using a moveable chimney and moveable charcoal grate.

SUMMARY OF THE INVENTION

In one embodiment, the present invention provides for a barbecue cooking system with moveable charcoal chimney device, the system comprises: a firebowl having an open topside and a bottomside, and the bottomside comprising at least one aperture; and a chimney movable through the aperture of the bottomside of the firebowl, and at least a portion of the chimney is situated within the firebowl during a usage position and at least a portion of the chimney is moveable to a position below the firebowl during a stowage position.

In another embodiment, the system further comprises a base having top and bottom portions, and the bottomside of the firebowl is situated upon the top portion of the base. In yet another embodiment, the system further comprises an actuator for moving the chimney.

In still another embodiment, the base comprises an internal cavity and at least one aperture, and at least a portion of the chimney is situated within the internal cavity of the base during the stowage position. In still yet another embodiment, at least a portion of the actuator is situated within the internal cavity of the base, and the actuator comprises a handle protruding through the aperture of the base.

In a further embodiment, the system further comprises a charcoal grate. In another further embodiment, at least a portion of the charcoal grate is designed to collapse within the chimney during a charcoal igniting stage. In yet a further embodiment, at least a portion of the chimney is situated within the firebowl during the charcoal igniting stage. In still a further embodiment, the charcoal grate is expanded during a cooking stage. In still yet a further embodiment, at least a portion of the chimney is moveable to a position below the firebowl during the cooking stage.

In another embodiment, the system further comprises a charcoal grate actuator designed to move the charcoal grate between the charcoal igniting stage and cooking stage.

In yet another embodiment, the system further comprises a housing, and at least a portion of the chimney is designed to fit within the housing, and the housing is situated below the firebowl.

In still another embodiment, the charcoal grate has an external portion and an internal portion. In still yet another embodiment, the internal portion of the charcoal grate is situated within the internal cavity of the chimney and is moveable with the chimney. In a further embodiment, the internal portion of the charcoal grate and at least a portion of the internal cavity of the chimney forms a basket for holding charcoal. In another further embodiment, the charcoal grate comprises a central hub grate and a multiplicity of extensions pivotally attached to said hub grate at its periphery enabling a basket configuration and a flat configuration to be formed. In yet another further embodiment, the hub grate is moveable vertically relative to the firebowl between a lower and an upper position. In still another further embodiment, the charcoal grate is in its basket configuration while the hub grate is in its lower position. In still yet another further embodiment, the charcoal grate is in its flat configuration while the hub grate is in the upper position.

In another embodiment, the charcoal grate comprises an inner grate, an outer grate surrounding the inner grate and a gap between the inner and outer grates through which the chimney may move between the usage and stowage positions.

In still another embodiment, the system further comprises a cooking grate situated above the charcoal grate. In yet another embodiment, the system further comprises a heat source situated below the firebowl. In still yet another embodiment, the heat source is a flammable gas torch.

In another further embodiment, the base is an elongated tube. In still a further embodiment, the system further comprises an elongated column situated below the firebowl and a platform situated below the column.

In another embodiment, the present invention provides for a charcoal preparation system for a cooking apparatus, and the system comprises: a firebowl having an open topside and a bottomside, and the bottomside comprises at least one aperture; and a charcoal starting device comprising at least one charcoal grate and at least one chimney, and at least a portion of the charcoal grate is moveable to a first position below the firebowl during a charcoal igniting stage and to a second position within the firebowl during a cooking stage, and at least a portion of the charcoal grate is designed to fit within the chimney, and the chimney is movable through the aperture of the bottomside of the firebowl, and at least a portion of the chimney is situated within the firebowl during a usage position and is moveable to a position below the firebowl during a stowage position.

In another further embodiment, the system further comprises a base, and the base is attached to the bottomside of the firebowl. In yet a further embodiment, the system further comprises an elongated housing situated on an external surface of the bottomside of the firebowl, and the housing comprises an internal cavity, an external surface and at least two apertures, and at least a portion of the charcoal starting device being situated with the internal cavity of the housing of the base during the charcoal igniting stage, and at least a portion of the chimney is situated within the internal cavity of the housing of the base during the stowage position.

In still a further embodiment, the system further comprises a first actuator for moving the charcoal grate and a second actuator for moving the chimney, and at least a portion of the first and second actuators are situated within the internal cavity of the housing of the base, and each of the actuators comprises a handle protruding through the apertures of said housing.

In still yet a further embodiment, the system comprises a heat source situated below the firebowl. In another further embodiment, the heat source is a flammable gas torch. In yet another further embodiment, the heat source comprises a tank, and an extended portion and a nozzle portion from which the flame originates, and the tank is situated external of the base, and at least a portion of the extended portion and the nozzle portion is situated within the internal cavity of the base.

In still another embodiment, the system further comprises a column connected to the bottomside of the firebowl. In still yet another embodiment, the column comprises an internal cavity and the aperture of the firebowl leads to the internal cavity of the column. In a further embodiment, the column comprises top and bottom portions, the top portion of the column is connected to the bottomside of the column and the bottom portion of the column being connected to the base.

In still another embodiment, the charcoal grate is a foldable grate which is moveable between the charcoal igniting stage wherein the charcoal grate is folded to form a basket for holding the charcoal and the cooking stage wherein the charcoal grate is unfolded to form a generally flat grate for holding burning charcoal. In yet another embodiment, the charcoal grate comprises a central hub and a plurality of petal-like structures pivotally attached to the hub and extending outwardly from the hub to thereby form a circular array, and the structures are designed to pivot upwardly to form the basket and designed to pivot downwardly to form the generally flat grate.

In still yet another embodiment, the system further comprises a grate situated above the charcoal grate.

In a further embodiment, the chimney has an internal cavity, and the charcoal grate collapses within the cavity of the chimney during the charcoal igniting stage, and at least a portion of the chimney is situated within the firebowl during the charcoal igniting stage. In another further embodiment, the charcoal grate is expanded and within the firebowl during the cooking stage, and at least a portion of the chimney is moveable to a position below the firebowl during the cooking stage. In yet a further embodiment, the charcoal grate has an external portion and an internal portion. In still a further embodiment, the internal portion of the charcoal grate is situated within the internal cavity of the chimney and is moveable within the chimney. In still yet a further embodiment, the internal portion of the charcoal grate and at least a portion of the internal cavity of the chimney forms a basket for holding charcoal.

In another embodiment, the present invention provides for a barbecue cooking system with moveable charcoal chimney device, and the system comprises: a firebowl having an open topside and a bottomside; a moveable chimney, and at least a portion of the chimney is situated within the firebowl during a usage position and at least a portion of the chimney is moveable to a position below the bottomside of the firebowl during a stowage position; and an actuator designed to move the chimney between the use and non-use positions.

In another further embodiment, the system further comprises an elongated column attached to the bottomside of the firebowl and a stand attached to the column, and the column comprising an internal cavity, and the chimney is designed to fit within the internal cavity of the column.

In another embodiment, the charcoal igniting stage is performed as follows: the actuator is moved in a position that allows the charcoal grate to form a basket and at least a portion of the basket is situated below the firebowl; the actuator of the chimney is positioned so that the chimney is still situated below the firebowl; charcoal briquettes are poured then poured into the charcoal grate basket and slightly heaped (in other embodiments, the charcoal briquettes are placed on the expanded charcoal grate and then, the basket is formed); the chimney is then raised by moving the actuator (in some embodiments, the actuator is moved in an upwardly direction to raise the chimney and moved in a downwardly direction to lower the chimney and in some other embodiments, the actuator is moved in a downwardly direction to raise the chimney and moved in an upwardly direction to lower the chimney; the access door is opened and paper is crumbled and inserted under the basket; and the paper is ignited and access door closed allowing the smoke to vent through the chimney and allow the charcoal to be ignited.

In another further embodiment, the cooking stage is performed as follows: after the charcoal has been ignited (usually 15 to 20 minutes), the chimney is lowered and the basket is raised by moving the respective actuators; the basket actuator may be moved side to side to redistribute the ignited charcoal on the charcoal grate; the cooking grate is placed above the charcoal grate with the charcoal and the foodstuff to be cooked is placed on the cooking grate and the cover is placed over the firebowl and airflow may be controlled by adjusting a vent on the lid cover.

In still another further embodiment, the cleanup stage is performed as follows: make sure the ash bin is situated adjacent the aperture at the bottomside of the firebowl and use the actuator to encourage the ash to fall through the aperture and into the ash bin; and the ash bin may then be removed and emptied (at times, every one to three uses).

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 2b is a cross-sectional view of FIG. 2a;

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Referring now to FIGS. 1-4, the present invention provides for a cooking apparatus 1 comprising a firebowl 2, a column 3 and a base 4. The top portion of the column 3 is attached to a bottomside of the firebowl 2 and the bottom portion of the column 3 is attached to a base 4. There is a moveable charcoal grate 5 situated within the firebowl and a cooking grate 7 adapted to be situated above the charcoal grate 5 during a cooking stage. There is a moveable chimney 6 (not shown in FIG. 1). There are two actuators, 9a and 9b respectively, which are connected to and designed to move the charcoal grate 5 and the chimney 6. There are at least two handles 8 situated on an external surface of the firebowl 2.

Figure 1:
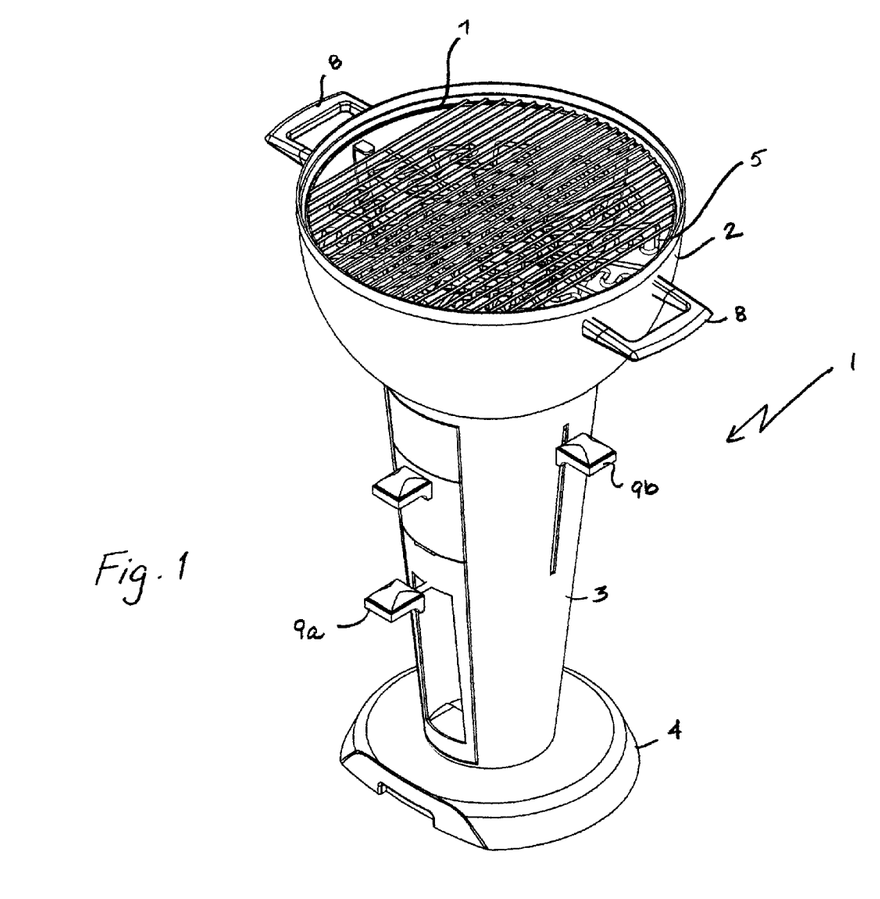
FIG. 1 is a front perspective view of one of the embodiments of the barbecue cooking systems of the present invention.
Figure 2A:
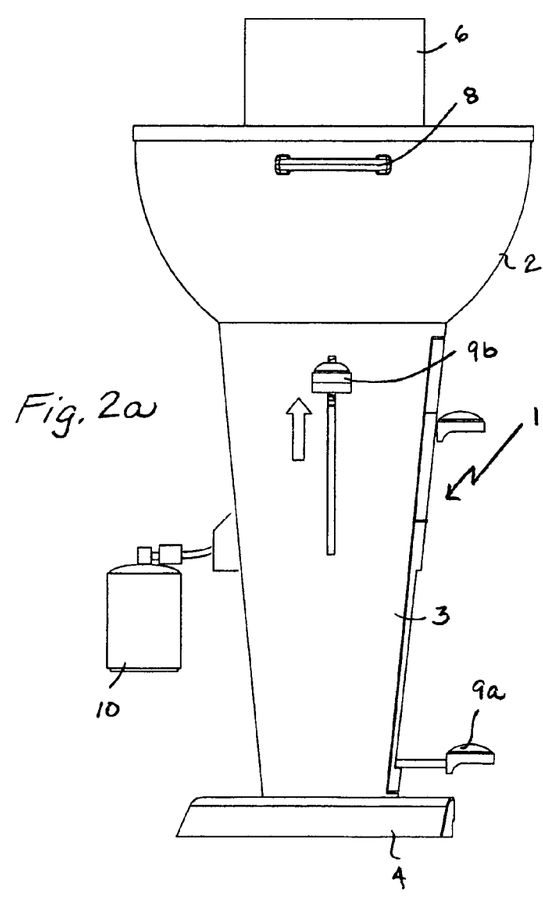
FIG. 2a is a side view of FIG. 1 showing the chimney in a usage position.
Figure 2B:
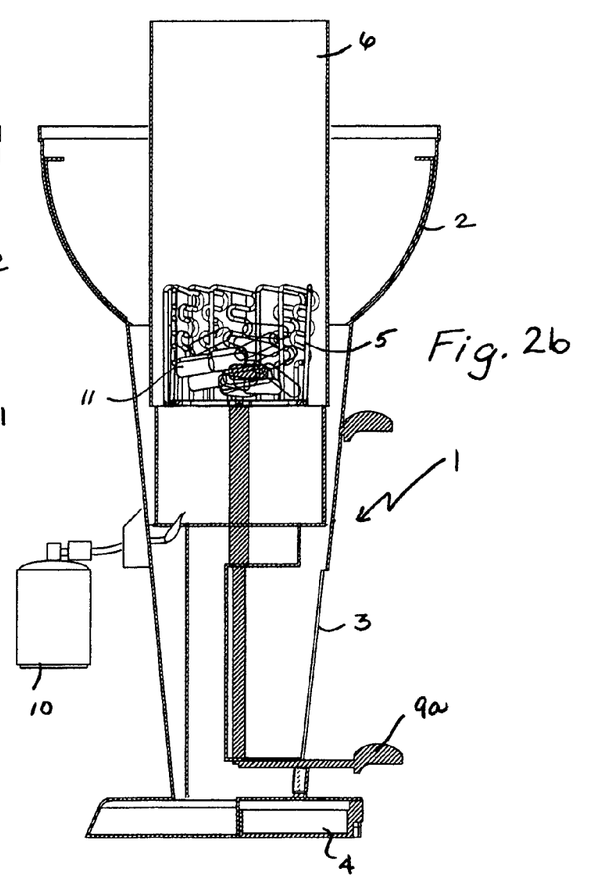

FIGS. 2a and 2b show the chimney 6 in the usage position and the charcoal grate 5 in the charcoal igniting stage. There is a heat source 10 attached to the column and situated adjacent to the charcoal grate during the charcoal igniting stage. The heat source 10 may be a flammable gas torch. FIG. 2b shows a cross-sectional view of the cooking apparatus 1. During its charcoal igniting stage, the charcoal grate 5 is collapsed into a "basket" form for holding the charcoals 11 which are being ignited by the heat source 10. In one embodiment, at least a portion of the charcoal grate 5 is situated within an internal cavity of the chimney 6 during the charcoal igniting stage.

Figure 3A:
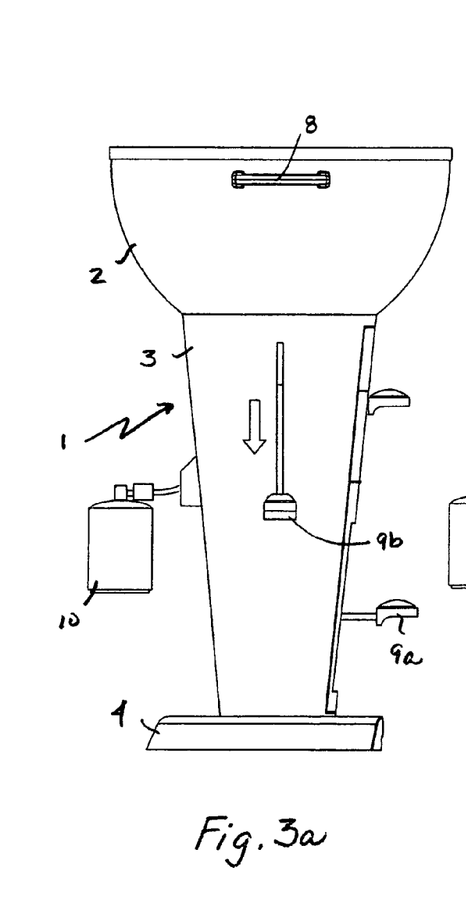
FIG. 3a is a side view of FIG. 1 of the present invention.
Figure 3B:
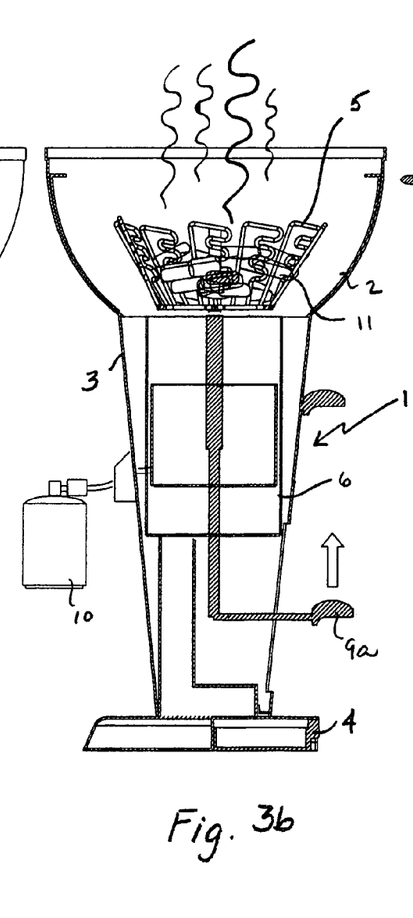
FIG. 3b is a cross-sectional view of FIG. 3a showing a first actuator moving the charcoal grate from the charcoal igniting stage to the cooking stage.
Figure 3C:
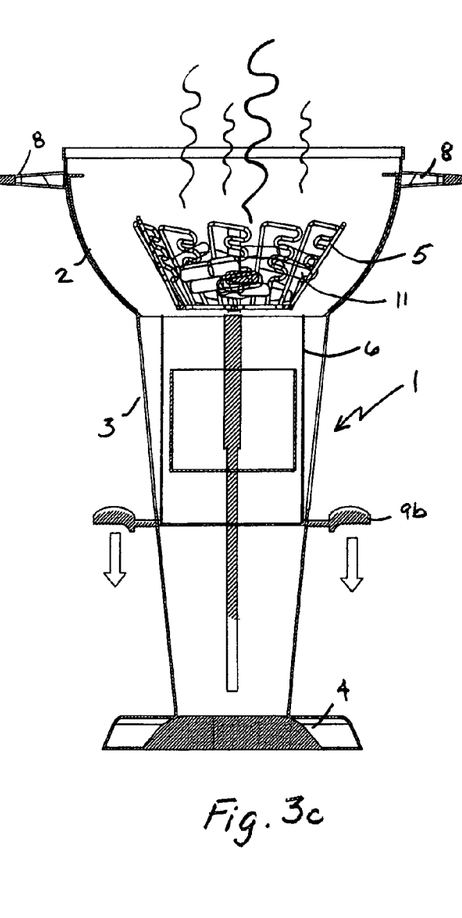
FIG. 3c is a cross-sectional view of the cooking system of the present invention showing the second actuator moving the chimney from the usage position to the stowage position.

FIGS. 3a, 3b and 3c illustrate the transition of the chimney 6 from the usage position to the stowage position and the charcoal grate 5 from the charcoal igniting stage to the cooking stage. Once the charcoals 11 have been ignited, the actuator 9a is activated to allow the ascent of the charcoal grate 5 from the internal cavity of the column 3 to the internal cavity of the firebowl 2. The actuator 9b is also activated to allow the descent of the chimney 6 from the internal cavity of the firebowl 2 into the internal cavity of the column 3.

Figure 4A:
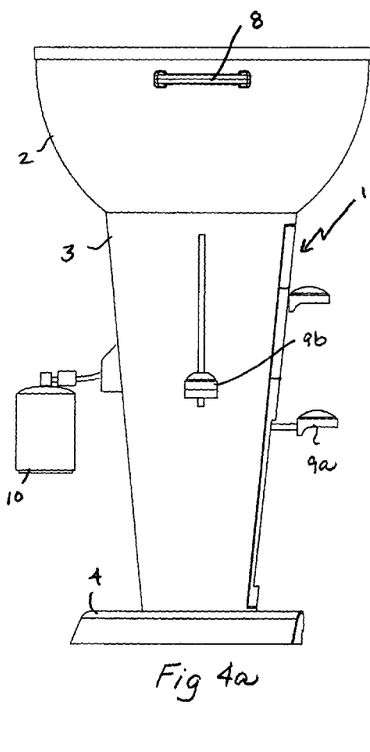
FIG. 4a is a side view of FIG. 1 showing the chimney in the stowage position.
Figure 4B:
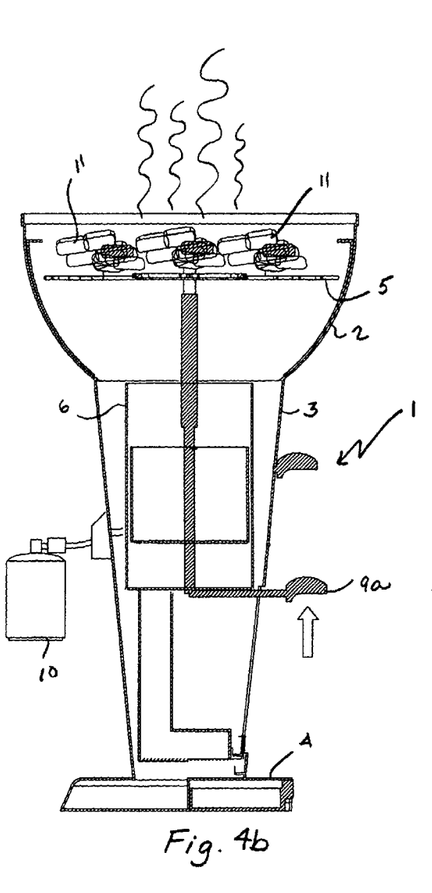
FIG. 4b is a cross-sectional view of FIG. 4a showing the charcoal grate in the cooking stage.

FIGS. 4a and 4b show the chimney 6 in its stowage position and the charcoal grate 5 with the ignited charcoals 11 in its cooking stage. During its stowage position, the chimney 6 is situated within the internal cavity of the column 3. During its cooking stage, the charcoal grate 5 is expanded to allow the exposure of the ignited charcoals 11 and situated within the internal cavity of the firebowl 2.

Figure 5:
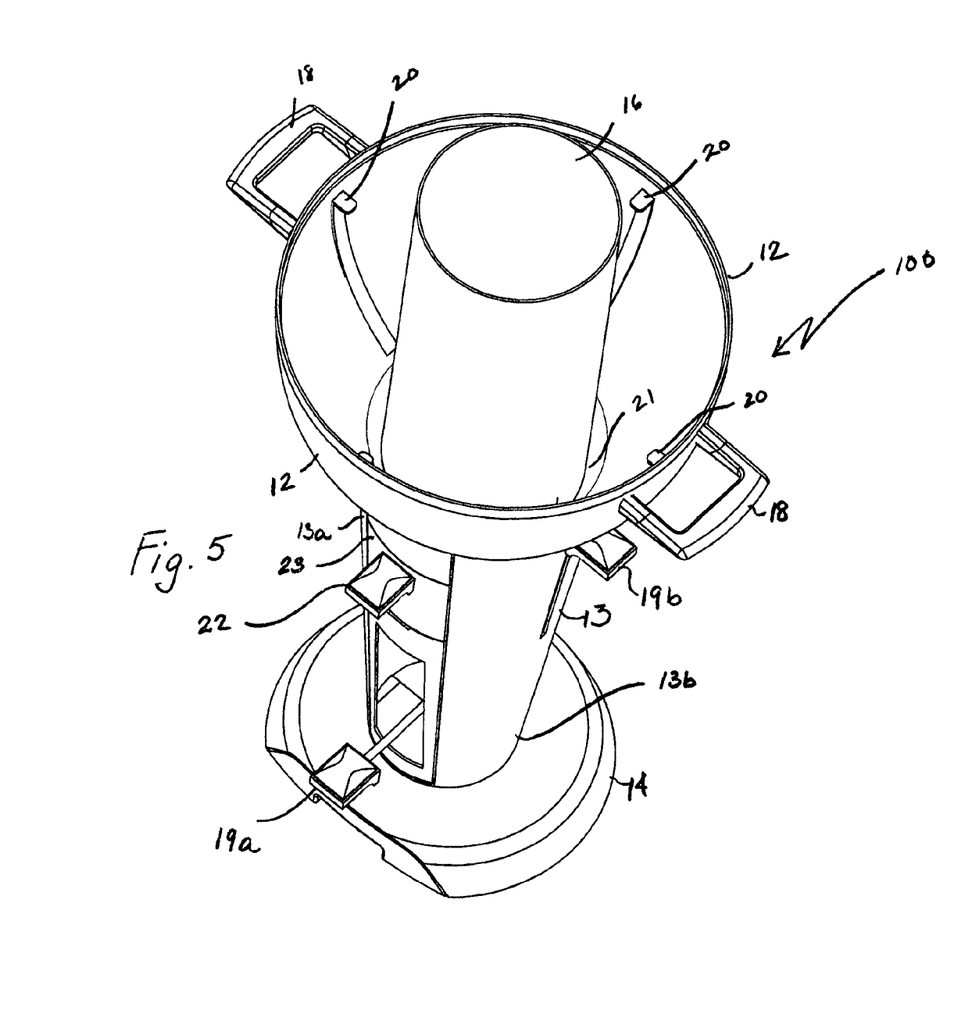
FIG. 5 is a top perspective view of one of the embodiments of the present invention, in particular, the cooking apparatus with the moveable chimney.

FIG. 5 shows another embodiment of the present invention showing the cooking system 100 with its moveable chimney 16. The cooking system 100 comprises a firebowl 12 with an aperture 21 on its bottomside, a column 13 having top and bottom portions, 13a and 13b respectively, and a base 14. The top portion 13a of the column 13 is attached to the bottomside of the firebowl 12 and the bottom portion 13b of the column 13 is attached to the base 14. The column 13 has an internal cavity (not shown) and the aperture 21 of the firebowl 12 leads to the internal cavity of the column 13. There are handles 18 which are situated on opposing sides of the external surface of the firebowl 12. There are also supports 20 for a cooking grate (not shown) situated within the firebowl 12. There is also an access door 23 with a handle 22 for accessing the internal cavity of the column 13. There are two actuators, 19a and 19b respectively, protruding from apertures on the external surface of the column 13. The actuator 19b activates the movement of the chimney 16 from the usage position to stowage position and back to the usage position. The chimney 16 moves downwardly through the aperture 21 of the firebowl 12 into the internal cavity of the column 13 for storage. The chimney 16 moves upwardly from the internal cavity of the column 13 through the aperture 21 and into the internal cavity of the firebowl 12 to achieve the usage position. At least the top portion of the chimney is situated above the topside opening of the firebowl 12 during the usage position.

FIGS. 6-10 demonstrate another embodiment of the present invention, in particular, the cooking system 30 with the moveable charcoal grate 35. The cooking system comprises a firebowl 32 with a bottomside attached to a column 33 and the column 33 is attached to a stand or base 34. The external surface of the firebowl 32 comprises handles 38. The external surface of the column 33 shows an access door 43 with its handle 42 and apertures which allow for the protrusion of at least two actuators, 39a and 39b respectively.

Figure 6:
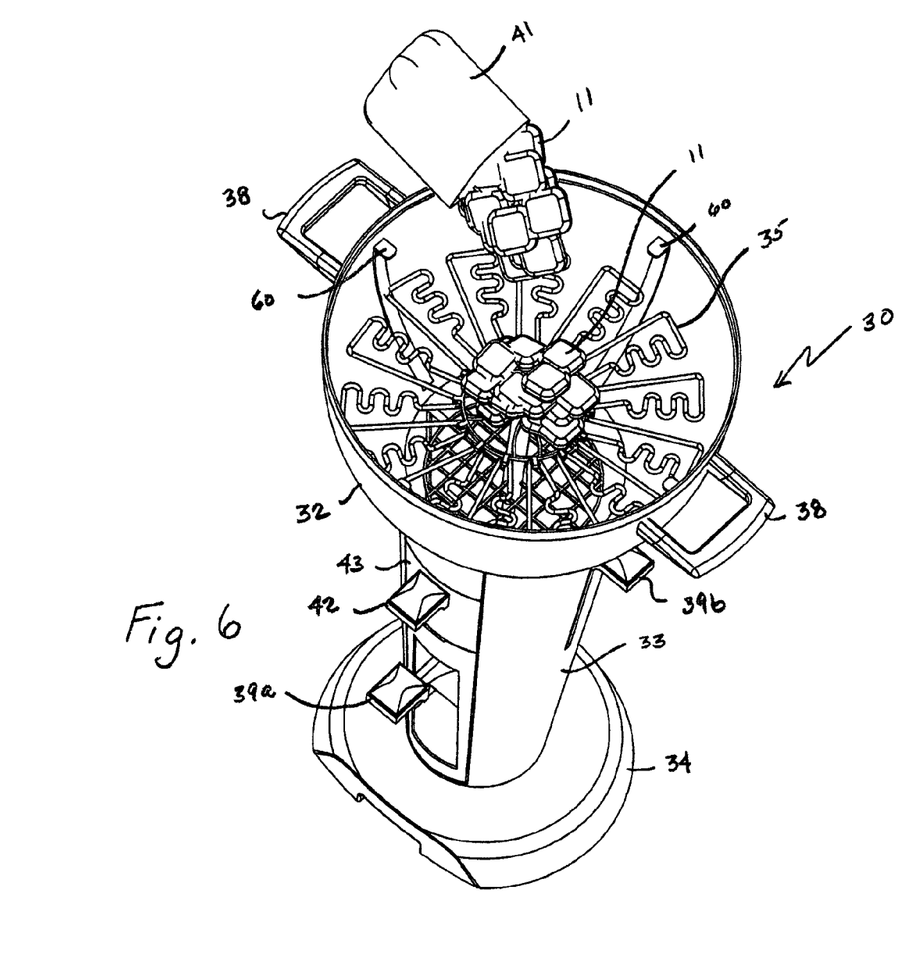
FIG. 6 is a top perspective view of the charcoal grate of the present invention being filled with charcoal.
Figure 7:
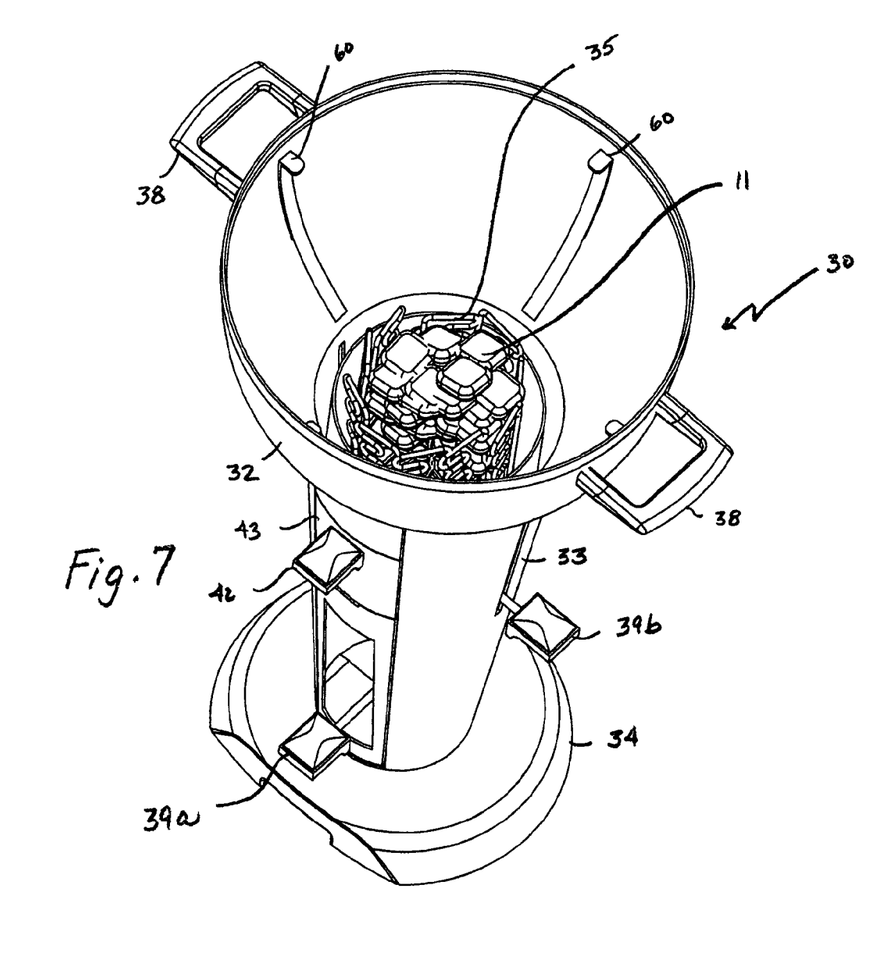
FIG. 7 is a top perspective side view of FIG. 6 showing the formation of the "basket" and descent of the collapsed charcoal grate.
Figure 8:
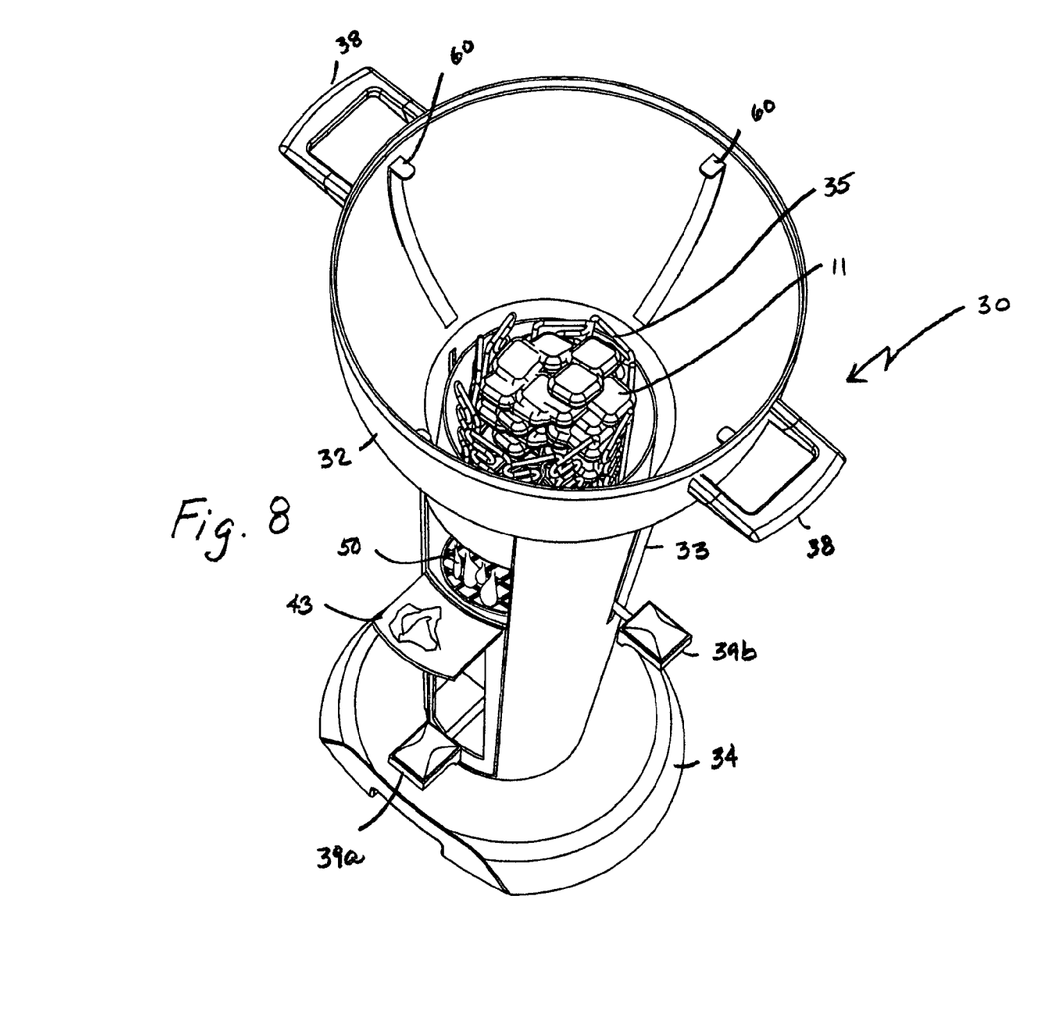
FIG. 8 is a top perspective view of FIG. 7 showing a heat source being applied to the charcoal in the charcoal grate.
Figure 9:
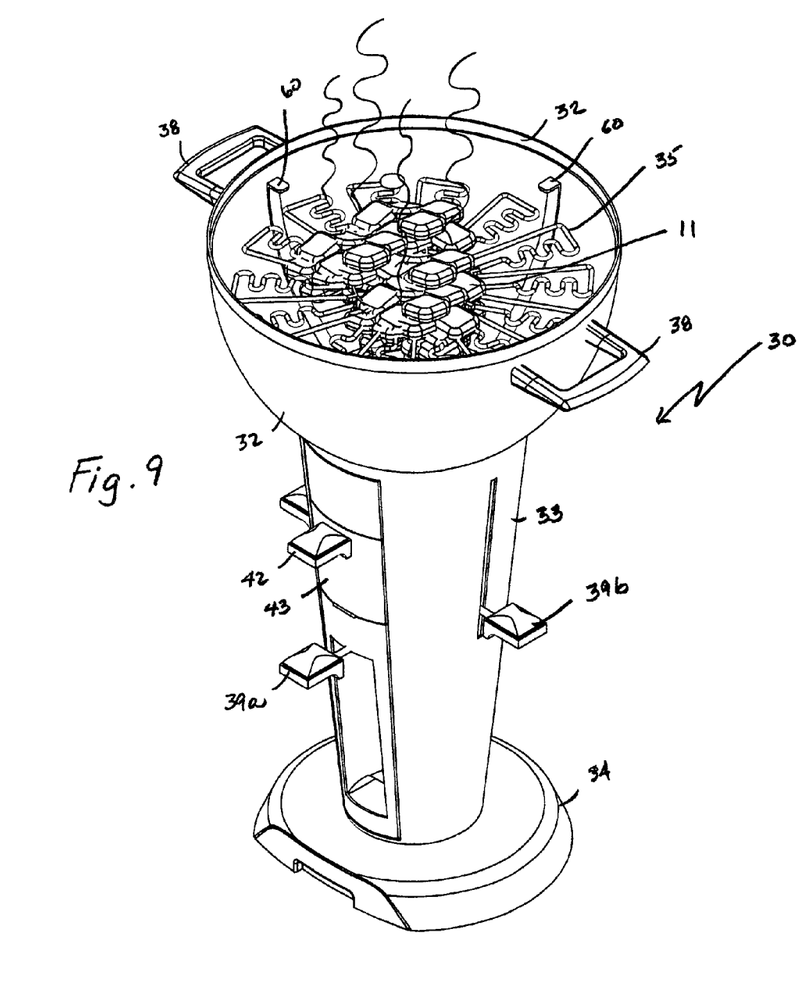
FIG. 9 is a perspective view of FIG. 8 showing the ignited charcoal and the charcoal grate in the cooking stage.
Figure 10:
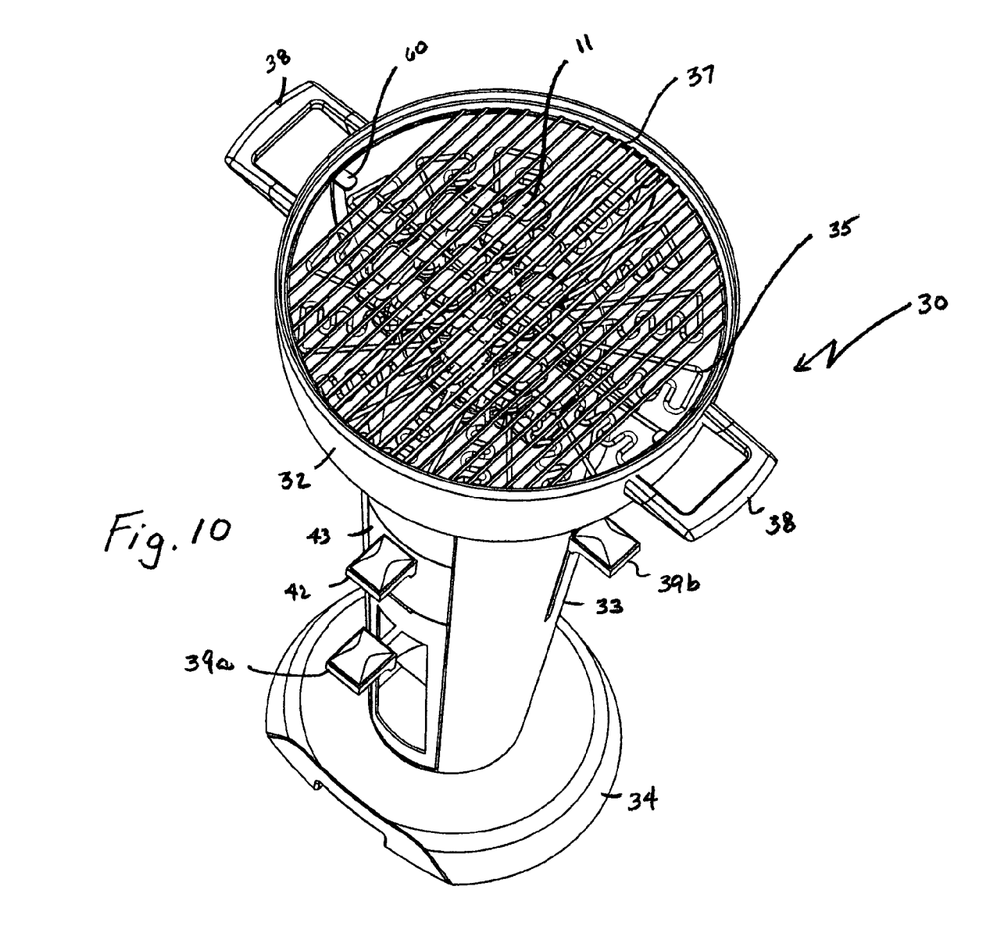
FIG. 10 is a top perspective view of FIG. 9 showing the cooking grate being situated above the ignited charcoal and the charcoal grate in the cooking stage.

FIG. 6 shows the first stage of the charcoal igniting process of the present invention. A bag 41 of charcoals 11 are poured into the expanded charcoal grate 35 or charcoal grate basket. FIG. 7 shows the second stage wherein the actuator 39a is activated to allow the charcoal grate 35 begins to collapse to create the "basket" form and allow for the descent of the charcoal grate from the internal cavity of the firebowl, through the aperture of the firebowl 32 and into the internal cavity of the column 33. FIG. 8 shows how a heat source 50 is applied to the charcoal grate 35 to ignite the charcoal 11. In one embodiment, the access door 43 with its handle 42 is used to access the charcoal grate 35 and apply the heat source to ignite the charcoal 11. In this one embodiment, the heat source is paper or other flammable materials. FIG. 9 shows that once the charcoals 11 are ignited, the actuator 39a is activated to raise the charcoal grate 35 with the ignited charcoals 11 from the internal cavity of the column 33 to the internal cavity of the firebowl 32. The charcoal grate 35 goes from the "basket" form to its expanded form to expose the ignited charcoals 11. In another embodiment, the actuator 39a may be moved side to side or up and down to distribute the ignited charcoals 11 evenly across the charcoal grate 35. FIG. 10 shows how the cooking grate 37 is situated upon the supports 60 and positioned above the ignited charcoals 11 on the charcoal grate 35.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A barbecue cooking system with moveable charcoal chimney device, said system comprising:
   a firebowl having an open topside and a bottomside, said bottomside comprising at least one aperture;
   a base having top and bottom portions, an internal cavity and at least one aperture, said bottomside of said firebowl being situated upon said top portion of said base; and
   a chimney movable through said aperture of said bottomside of said firebowl, at least a portion of said chimney being situated within said firebowl during a usage position and at least a portion of said chimney being moveable to a position below said firebowl during a stowage position, at least a portion of said chimney being situated within said internal cavity of said base during said stowage position;
   an actuator for moving said chimney, at least a portion of said actuator is situated within said internal cavity of said base, said actuator comprising a handle protruding through said aperture of said base.

2. The system of claim 1 further comprising a charcoal grate.

3. The system of claim 2 wherein at least a portion of said charcoal grate is designed to collapse within said chimney during a charcoal igniting stage.

4. The system of claim 3 wherein at least a portion of said chimney is situated within said firebowl during said charcoal igniting stage.

5. The system of claim 2 wherein said charcoal grate is expanded during a cooking stage.

6. The system of claim 5 wherein at least a portion of said chimney is moveable to a position below said firebowl during said cooking stage.

7. The system of claim 6 further comprising a charcoal grate actuator designed to move said charcoal grate between said charcoal igniting stage and cooking stage.

8. The system of claim 1 further comprising a housing, at least a portion of said chimney is designed to fit within said housing, said housing being situated below said firebowl.

9. The system of claim 2 wherein said charcoal grate has an external portion and an internal portion.

10. The system of claim 7 wherein said internal portion of said charcoal grate is situated within said internal cavity of said chimney and is moveable within said chimney.

11. The system of claim 7 wherein said internal portion of said charcoal grate and at least a portion of said internal cavity of said chimney forms a basket for holding charcoal.

12. The system of claim 2 wherein said charcoal grate comprises a central hub grate and a multiplicity of extensions pivotally attached to said hub grate at its periphery enabling a basket configuration and a flat configuration to be formed.

13. The system of claim 12 wherein said hub grate is moveable vertically relative to said firebowl between a lower position and an upper position.

14. The system of claim 13 wherein said charcoal grate is in said basket configuration while said hub grate is in said lower position.

15. The system of claim 14 wherein charcoal grate is in said flat configuration while said hub grate is in said upper position.

16. The system of claim 2 wherein said charcoal grate comprises an inner grate, an outer grate surrounding said inner grate and a gap between said inner and outer grates through which said chimney may move between said usage and stowage positions.

17. The system of claim 2 further comprising a cooking grate situated above said charcoal grate.

18. The system of claim 1 further comprising a heat source situated below said firebowl.

19. The system of claim 18 wherein said heat source is a flammable gas torch.

20. The system of claim 1 further comprising an elongated column situated below said firebowl and a platform situated below said column.

21. A charcoal preparation system for a cooking apparatus, said system comprising:
   a firebowl having an open topside and a bottomside, said bottomside comprising at least one aperture;
   a charcoal starting device comprising at least one charcoal grate and at least one chimney, at least a portion of said charcoal grate being moveable to a first position below said firebowl during a charcoal igniting stage and to a second position within said firebowl during a cooking stage, at least a portion of said charcoal grate is designed to fit within said chimney, said chimney being movable through said aperture of said bottomside of said firebowl, at least a portion of said chimney being situated within said firebowl during a usage position and being moveable to a position below said firebowl during a stowage position;
   a housing situated on an external surface of said bottomside of said firebowl, said housing comprising an internal cavity, an external surface and at least two apertures, at least a portion of said charcoal grate being situated within said internal cavity of said housing during said charcoal igniting stage, at least a portion of said chimney being situated within said internal cavity of said housing during said stowage position; and
   a first actuator for moving said charcoal grate and a second actuator for moving said chimney, at least a portion of said first and second actuators being situated within said internal cavity of said housing, each of said actuators comprising a handle protruding through said apertures of said housing.

22. The system of claim 21 further comprising a base, said base being attached to said bottomside of said firebowl.

23. The system of claim 21 further comprising a heat source situated below said firebowl.

24. The system of claim 23 wherein said heat source is a flammable gas torch.

25. The system of claim 23 wherein said heat source comprises a tank, an extended portion and a nozzle portion from which the flame originates, said system further comprising a housing attached to said bottomside of said firebowl and having an internal cavity, said tank being situated external of said housing, at least a portion of said extended portion and said nozzle portion being situated within said internal cavity of said housing.

26. The system of claim 21 further comprising a column connected to said bottomside of said firebowl.

27. The system of claim 26 wherein said column comprises an internal cavity and said aperture of said firebowl leads to said internal cavity of said column.

28. The system of claim 26 wherein said column comprises top and bottom portions, said top portion of said column being connected to said bottomside of said firebowl and said bottom portion of said column being connected to said a base.

29. The system of claim 21 wherein said charcoal grate is a foldable grate which is moveable between said charcoal igniting stage wherein said charcoal grate is folded to form a basket for holding the charcoal and said cooking stage wherein said charcoal grate is unfolded to form a generally flat grate for holding burning charcoal.

30. The system of claim 29 wherein said charcoal grate comprises a central hub and a plurality of petal-like structures pivotally attached to said hub and extending outwardly from said hub to thereby form a circular array, said structures are designed to pivot upwardly to form said basket and designed to pivot downwardly to form said generally flat grate.

31. The system of claim 21 further comprising a grate situated above said charcoal grate.

32. The system of claim 21 wherein said chimney has an internal cavity, said charcoal grate collapses within said cavity of said chimney during said charcoal igniting stage, at least a portion of said chimney is situated within said firebowl during said charcoal igniting stage.

33. The system of claim 32 wherein said charcoal grate is expanded and is situated within said firebowl during said cooking stage, at least a portion of said chimney being moveable to a position below said firebowl during said cooking stage.

34. The system of claim 21 wherein said charcoal grate has an external portion and an internal portion.

35. The system of claim 34 wherein said internal portion of said charcoal grate is situated within said internal cavity of said chimney and is moveable within said chimney.

36. The system of claim 34 wherein said internal portion of said charcoal grate and at least a portion of said chimney forms a basket for holding charcoal.

37. The system of claim 32 further comprising an elongated column attached to the bottomside of said firebowl and a stand attached to said column, said column comprising an internal cavity, said chimney designed to fit within said internal cavity of said column.

38. A barbecue cooking system with moveable charcoal chimney device, said system comprising:
    a firebowl having an open topside and a bottomside, said bottomside comprising at least one aperture;
    a chimney movable through said aperture of said bottomside of said firebowl, at least a portion of said chimney being situated within said firebowl during a usage position and at least a portion of said chimney being moveable to a position below said firebowl. during a stowage position; and
    a charcoal grate comprising an inner grate, an outer grate surrounding said inner grate and a gap between said inner and outer grates through which said chimney may move between said usage and stowage positions.

* * * * *